No. 652,260. Patented June 26, 1900.
W. G. & F. E. GRIFFETH.
ATTACHING OR DETACHING DEVICE FOR HARNESS.
(Application filed Oct. 19, 1899.)
(No Model.)
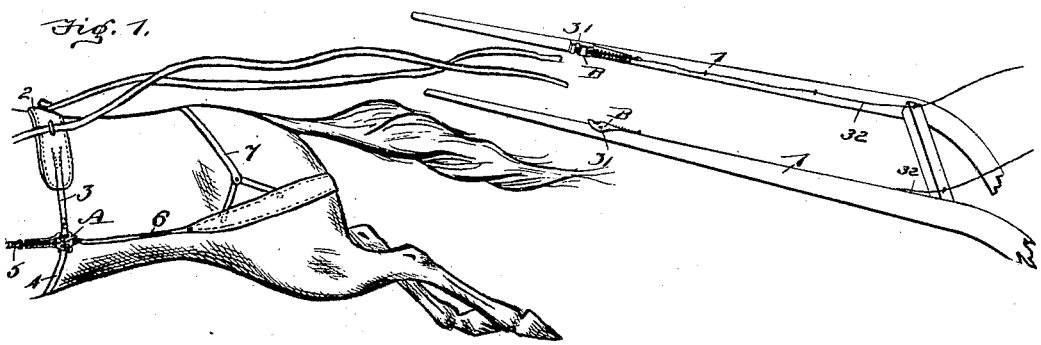
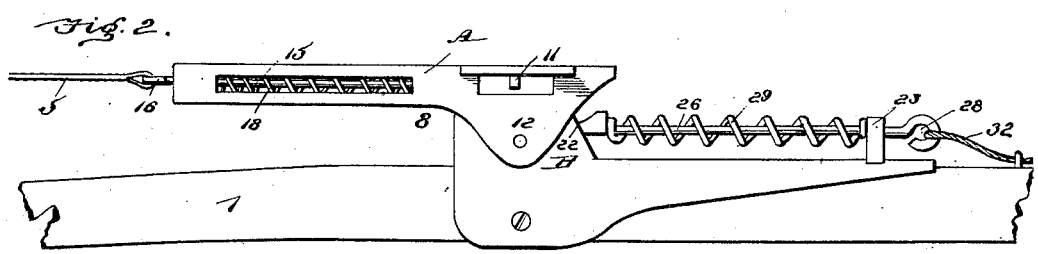
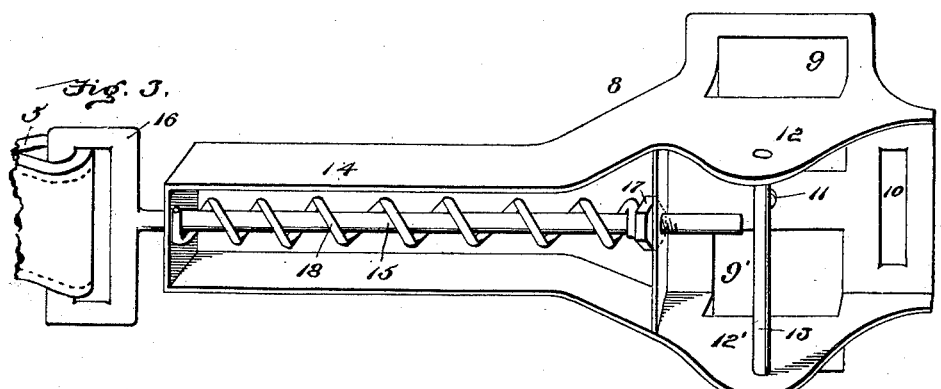
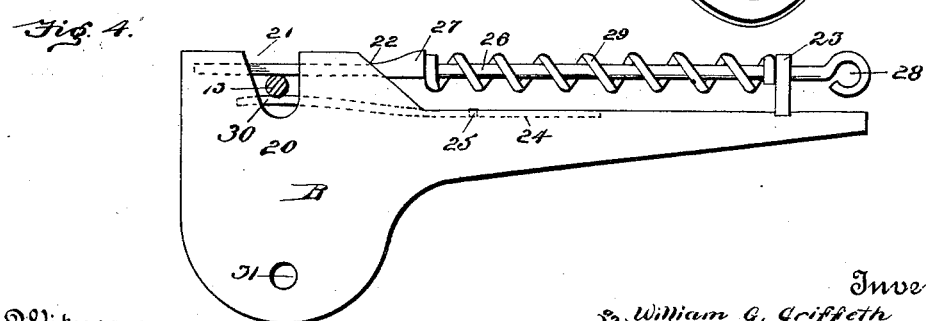
Witnesses
Edwin B. H. Tower, Jr.
Herbert D. Lawson
Inventors
William G. Griffeth
Francis E. Griffeth
By Edson Bros
Attorneys
THE NORRIS PETERS CO., PHOTO-LITHO., WASHINGTON, D. C.

UNITED STATES PATENT OFFICE.

WILLIAM G. GRIFFETH AND FRANCIS E. GRIFFETH, OF BOGART, GEORGIA, ASSIGNORS TO THE NORTH AMERICAN MANUFACTURING COMPANY.

ATTACHING OR DETACHING DEVICE FOR HARNESS.

SPECIFICATION forming part of Letters Patent No. 652,260, dated June 26, 1900.

Application filed October 19, 1899. Serial No. 734,108. (No model.)

*To all whom it may concern:*

Be it known that we, WILLIAM G. GRIFFETH and FRANCIS E. GRIFFETH, citizens of the United States, residing at Bogart, in the county of Oconee and State of Georgia, have invented certain new and useful Improvements in Attaching or Detaching Devices for Harness; and we do hereby declare the following to be a full, clear, and exact description of the invention, such as will enable others skilled in the art to which it appertains to make and use the same.

Our invention relates to certain new and useful improvements in devices for attaching and detaching horses to and from the shafts of vehicles; and its object, among other things, is to provide a simple, economical, and durable contrivance by means of which horses may be instantly detached from the shafts of a vehicle, whereby in the event of a runaway or when a horse becomes fractious and unmanageable and danger is imminent it can be released from a vehicle without injury thereto.

Another object is to so construct the device as to dispense with the traces, shaft-tugs, and singletree ordinarily used.

To these ends the invention consists in the novel construction and combination of parts hereinafter more fully described and claimed, and illustrated in the accompanying drawings, showing the preferred form of our invention, and in which—

Figure 1 is a perspective view showing the application of the invention. Fig. 2 is a similar view of the attachment removed from the harness. Fig. 3 is a detail perspective view of the combined buckle and draft-equalizing appliance. Fig. 4 is a similar view of the clasp by which the buckle is connected detachably to the shaft.

It is to be understood that the harness and shafts are of ordinary construction, excepting, as above stated, that the traces, shaft-tugs, and singletree are dispensed with.

Referring to the figures by letters and numerals of reference, 1 designates the shafts; 2, the saddle; 3, the tug-strap; 4, the girth; 5, the breast-strap; 6, the holdbacks, and 7 the hip-strap.

The attachment is composed of two sections A and B, detachably connected together, one section being attached to the harness and the other to the shafts of the vehicle. A pair of the attachments arranged on opposite sides of the harness constitute one set, and the two sides are of the same construction and interchangeable.

A indicates the section of the attachment which is connected with the harness and forms a combined buckle and draft-equalizing appliance, as shown in Fig. 3. This section A consists of the buckle 8, having openings 9 9' in either side thereof and provided with a loop 10 at its rear end, adapted to receive the holdback-strap 6, which connects with the breechings 7. A stud 11 is formed upon the surface of the buckle at a point intermediate two parallel outwardly-projecting plates 12 12', which are connected at their centers by means of a cross-bar 13. Extending forward from the buckle and preferably formed integral therewith is a barrel or casing 14, within which is slidably mounted a rod or draft-bar 15, to which is attached the breast-strap 5, having a loop 16 at its outer end and threaded at its inner end and provided with a nut 17, between which and the end of barrel 14 is a coiled spring 18, mounted upon the draft-bar 15 and bearing at opposite ends upon the end of the barrel 14 and sliding nut 17. It will thus be seen that a yielding connection is established between the draft-bar 15 and the coupling-buckle 8 by reason of the interposed coiled spring receiving the direct pull of the draft-bar, whereby the spring is compressed between the sliding nut 17 and the end of the barrel 14.

The openings or notches 9 9' are designed to receive the strap 3, which is adapted to fit over the stud 11, thereby securing the buckle to the saddle 2. The girth 4 is secured to the strap 3 in any desired manner, and it will be seen that this section A forms a connection between the saddle 2, the girth 4, the breast-strap 5, and the holdbacks 6.

B indicates the section of the attachment which is fixed to the shafts of the vehicle and is designed to be detachably connected to the buckle 8. This section consists of the clamp 20, provided with a slot 21 in the inner edge thereof. Said slot has its forward edge preferably inclined or beveled forward toward its open or inner side, whereby it is apparent that the cross-bar 13 of the section A would, by reason of the draft being exerted in that direction, even though its expelling-spring, hereinafter described, should lose its effective tension or force or be broken, readily release said cross-bar as the retaining-bolt or plunger, presently described, is retracted. A longitudinally-extending passage or opening 22 is provided, together with a groove 24, in the inner edge of the clamp. A lug or projection 23 is formed near the rear end of the clamp 20, and a stud 25 is formed within the groove 24. A bolt or plunger 26 is slidably mounted within the lug 23 and passage 22, and a shoulder 27 is formed thereon, against which bears one end of a coiled spring 29, mounted on the plunger 26 and bearing at its opposite end against lug 23. A ring, as 28, is preferably formed at the rear end of the plunger 26, and a flat spring 30 is mounted in groove 24. The clamp 20 is designed to fit against the inside of the shaft at or about the place usually occupied by the shaft-tug and made to bend around the upper and lower sides thereof and fastened securely thereto by means of screws at the points 31. The vertical slot 21 is cut transversely across the clamp 20 near its front edge and is designed to receive the cross-bar 13 of section A. The spring-actuated bolt or plunger 26 is made to pass longitudinally through the opening or passage 22 and the lug 23 and designed to slide across the vertical slot 21, and thereby confine the cross-bar 13 in said slot. The ring 28 at the rear end of the bolt 26 is provided with a release-cord 32, as shown. The coiled spring 29 is arranged longitudinally around the bolt 26, with one end bearing against the shoulder 27 and the other end against the lug 23 and tends to normally retain the bolt or plunger 26 across the vertical slot 21. The flat spring 30 is provided with a hole near its center and is arranged longitudinally in the groove 24, fitting over the outwardly-projecting stud 25 and securely bradded thereto. This spring projects across the vertical slot 21 in a plane with the plunger 26 and is designed to bear against the cross-bar 13 in section A and tend normally to force it out of the slot 21 when the plunger 26 is withdrawn from across the slot or to press it against the plunger 26 when the parts are connected. By this construction we insure the instant disconnection of the parts when it is desired to release the horse from the vehicle, and the plunger 26 is withdrawn from across the slot 21, and, furthermore, by constantly pressing the cross-bar 13 against the plunger 26 rattling of the parts when connected is prevented.

As before stated, a cord 32 (shown in Fig. 1) is attached to the ring 28 on the rear end of the spring-actuated plunger 26, and this cord passes back through small leather loops or screw-eyes under the lower inside edge of the shafts to or behind the cross-piece, and thence up to the vehicle in easy reach of the driver.

In the case of a runaway or when the horse becomes fractious and unmanageable from any cause and danger is imminent the driver pulls on the cord 32, withdrawing the plunger 26 from across the slot 21, while the spring 30, bearing against the cross-bar 13, forces it from the slot 21, thus instantly releasing the horse from the vehicle without injury to the driver or vehicle. If the vehicle is in motion when the horse is detached therefrom the driver holds to the release-cord 32 and supports the shafts, thereby preventing them striking the ground, and by pulling on either side of the cord guides or steers the vehicle in the right course until its momentum is lost.

It will be understood that a lug or other device may be formed on the plunger 26 to limit its retraction.

In the foregoing description we have shown the preferred form of our invention; but we do not limit ourselves thereto, as we are aware that modifications may be made therein without departing from the spirit or sacrificing the advantages thereof. For example, lugs may, if desired, be substituted for the cross-bar 13. We therefore reserve the right to make such changes as fairly fall within the scope of our invention. If desired, the stud 25 within the groove 24 may be dispensed with and the spring 30 so secured as to make a hole therein unnecessary. This can be done in any suitable manner, as by passing the spring through an opening formed in the clamp below and parallel with the passage 22, then within groove 24, and finally through a diagonal passage running through the clamp to the under surface thereof. This construction will, as is obvious, securely bind the spring in position without weakening it, as by forming a hole therein.

Having thus fully described our invention, what we claim, and desire to secure by Letters Patent, is—

A horse or animal detaching device comprising a harness-carried section, substantially such as shown and described, having a yielding draft-rod, to which is connected the breast-strap of the harness, and a cross-bar, and a thill-carried section having a transverse seat, with an inclined or beveled forward edge, adapted to receive and engage said cross-bar, a spring within the thill-carried section adapted to normally press against said cross-bar, and a retractable spring-pressed bolt or plunger, substantially as described.

In testimony whereof we affix our signatures in presence of two witnesses.

WILLIAM G. GRIFFETH.
FRANCIS E. GRIFFETH.

Witnesses:
ROBERT THOMPSON,
W. W. HUDSON.